United States Patent

[11] 3,632,353

[72] Inventors Richard G. Reimus;
 Anthony Saporito, both of Warren, Pa.
[21] Appl. No. 828,419
[22] Filed May 12, 1969
[45] Patented Jan. 4, 1972
[73] Assignee Struthers Scientific and International Corporation
 Continuation of Ser. No. 763,217, Sept. 27, 1968, abandoned, which is a division of application Ser. No. 718,510, Apr. 3, 1968, now Patent No. 3,432,308, dated Mar. 11, 1969, which is a division of application Ser. No. 511,173, Dec. 2, 1965, now Patent No. 3,381,302, dated Apr. 30, 1968. This application May 12, 1969, Ser. No. 828,419

[54] REMOVAL OF TARS AND WAXES IN FREEZE CONCENTRATION OF COFFEE
 12 Claims, 1 Drawing Fig.
[52] U.S. Cl. ............................................. 99/71,
 99/71, 99/205, 99/199, 62/58
[51] Int. Cl. ....................................... A23f 1/08,
 B01d 9/04
[50] Field of Search .......................... 99/71, 199,
 205; 62/58

[56] References Cited
 UNITED STATES PATENTS

| | | | |
|---|---|---|---|
| 3,216,833 | 11/1965 | McKay et al. | 99/199 |
| 3,362,178 | 1/1968 | Cottle et al. | 99/205 X |
| 3,283,522 | 11/1966 | Ganiaris | 62/58 |
| 3,381,302 | 4/1968 | Reimus et al. | 99/77 |
| 3,449,129 | 6/1969 | Reimus et al. | 99/77 |
| 1,507,410 | 9/1924 | Zorn | 99/71 |
| 1,636,890 | 7/1927 | Zorn | 99/206 |
| 2,234,063 | 3/1941 | Rolle | 99/77 |
| 2,389,732 | 11/1945 | Kellogg | 62/58 |
| 2,410,157 | 10/1946 | Fredrickson | 99/71 |
| 2,804,389 | 8/1957 | Tarasch | 99/71 |
| 2,891,865 | 6/1959 | Seltzer | 99/77 |
| 3,102,036 | 8/1963 | Smith | 99/205 |
| 3,224,880 | 12/1965 | Van Ike | 99/77 |
| 3,415,654 | 12/1968 | Zinn | 99/31 |
| 2,657,555 | 11/1953 | Wenzelberger | 62/58 |
| 2,735,779 | 2/1956 | Wenzelberger | 62/58 |
| 3,082,211 | 3/1963 | Green | 62/58 |
| 3,295,988 | 1/1967 | Malick | 62/58 |
| 3,495,522 | 2/1970 | Muller | 99/71 |

FOREIGN PATENTS

| | | | |
|---|---|---|---|
| 699,247 | 12/1964 | Canada | 99/205 C |
| 529,202 | 11/1940 | United Kingdom | 99/71 |
| 844,451 | 8/1960 | United Kingdom | 99/77 |

OTHER REFERENCES

Sivetz et al., Coffee Processing Technology, Vol. 1, 1963, Avi Publ. Co., Westport, Conn. pg. 481

Sivetz, Coffee Processing Technology, Vol. 2, 1963, Avi Publ. 6., Westport, Conn., pp. 16 and 148

Primary Examiner—Norman Yudkoff
Assistant Examiner—R. T. Foster
Attorney—William A. Drucker ABSTRACT: A process for making coffee concentrates is described in which liquid coffee of high solids concentration is chilled within a temperature range of 80° to 36° F. and precipitates formed within this temperature range are removed prior to freeze concentration by forming slush ice in the coffee, separating the ice from the coffee and then treating the ice so separated to recover residual coffee.

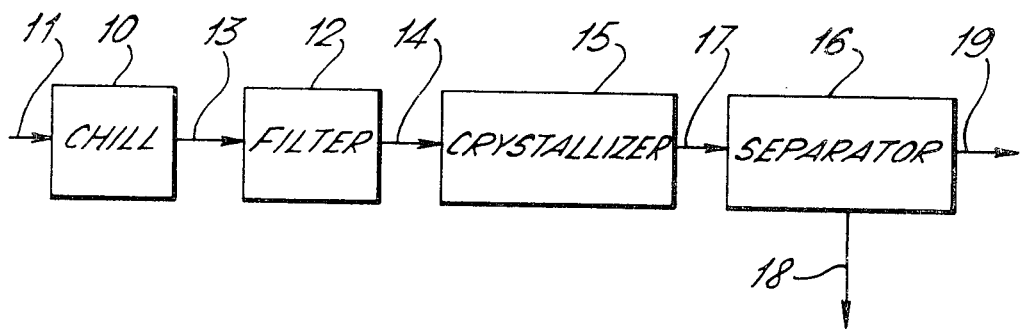

REMOVAL OF TARS AND WAXES IN FREEZE CONCENTRATION OF COFFEE

This application is a continuation of Ser. No. 763,217 filed Sept. 27, 1968, now abandoned, which is a division of Ser. No. 718,510 filed Apr. 3, 1968, now US Pat. No. 3,432,308 issued Mar. 11, 1969, which in turn is a division of Ser. No. 511,173 filed Dec. 2, 1965, now U.S. Pat. No. 3,381,302 issued Apr. 30, 1968.

This invention relates to an improvement in a process for the preparation of concentrated comestible liquids and liquid extracts and is particularly applicable to the preparation of soluble coffee solids or "powdered coffee." More particularly, this invention relates to the pretreatment of liquids and liquid extracts as a step preliminary to removal of water from the extract by a freezing process.

Soluble, or "powdered," coffee has been prepared by first extracting coffee beans with hot water and subsequently dehydrating the extract by spray drying under vacuum conditions. This process has met with vast commercial success, but the flavor of the soluble coffee leaves much to be desired. The vacuum conditions employed not only remove water from the extract, but also cause volatile taste and flavor elements of the coffee to evaporate. The resulting soluble product is, therefore, never as good as the extract from which it is prepared.

To improve the flavor of the soluble coffee, it has been often proposed to remove substantial amounts of water in the extract by partially freezing the extract and separating the resulting pure ice crystals from the concentrated extract. This process of partial freezing is then followed by a complete dehydration by evaporation of water which may be conducted under vacuum conditions. In this way, the coffee loses less of the volatile components by virtue of the fact that the extract is subject to evaporation conditions for shorter periods of time.

In a preferred embodiment of the freezing process, the coffee extract is partially frozen by indirect refrigeration in a suitable crystallizer and the resulting slurry of ice and concentrate is subjected to centrifugation to separate the ice from the concentrate. In order for the process to be economical, this separation and the subsequent water wash of the crystals on the centrifuge basket must effect a relatively complete removal of mother liquor from the ice crystals.

However, when coffee extract is cooled to near its initial freezing point, a gummy or waxy solid material often precipitates from solution prior to ice formation. This wax or tar is carried along with the ice crystals and coffee extract into the centrifuge and collects on the centrifuge basket, eventually plugging the basket and preventing the complete separation of ice from concentrated extract.

This problem of the precipitation of insoluble materials in the coffee extract is not a problem exclusive to coffee extracts alone, but is also encountered in the preparation of other concentrated extracts of comestible materials. Thus, the process of this invention is also applicable to the preparation of concentrated extracts of such comestible materials as tea, grape juice, apple juice, beer and orange juice.

It is therefore an object of this invention to provide an improved process for the concentration of comestible liquids and liquid extracts by partial freezing of the liquid or liquid extracts.

Another object of this invention is to provide a process in which a comestible liquid or liquid extract, free of insoluble elements at the freezing temperature of ice, is subjected to freeze concentration.

Yet another object of this invention is to provide an improved process for the concentration of coffee extract by partial freezing of the extract.

Still another object of this invention is to provide a process in which coffee extract, free of insoluble elements at the freezing temperature of ice, is subjected to freeze concentration.

The objects of this invention are accomplished by a process which comprises preparing a comestible liquid or liquid extract, cooling the liquid to precipitate material insoluble at the temperature at which ice forms therein, removing insolubles from the resulting mixture and then subjecting the insoluble-free mixture to concentration by partial freezing of water therefrom.

A preferred embodiment of this invention is a process which comprises extracting coffee beans at elevated temperatures with water to produce a coffee extract, cooling the extract to precipitate materials insoluble at the temperature at which ice forms in the brew, removing insolubles from the resulting mixture and then subjecting the insoluble-free mixture to concentration by partial freezing of water therefrom.

The initial steps in the process of preparing instant coffee are the same as preparing regular coffee. Following roasting, the coffee is ground, but the granulation may be extremely coarse and, in some cases, fine particles that may result from grinding are sieved out and used elsewhere.

The grounds are placed in closed containers known as extractors. These extractors are set up in batteries with several extractors to a battery.

Ground coffee and hot water are charged into the first extractor. The coffee is then extracted until the necessary materials have been removed from the grounds. The resulting extract is then charged into the second extractor containing fresh coffee. The second extractor is run until extraction is completed. The resulting coffee extract (which is now stronger than ordinary coffee beverage) is placed in the third extractor containing fresh grounds and the brewing process is again repeated.

In commercial plant operation, the process is conducted in a semicontinuous manner, the fresh water coming into an extraction battery first reaches the extractor having the most spent, exhausted grounds and proceeds from there to the next most spent grounds and so on until, finally, in the last extractor it reaches the fresh, most recently added grounds. This is known as a countercurrent extraction system.

Temperature and pressure in the extractor system will vary greatly. Coffee being produced from fresh grounds is usually processed at low temperature with low pressure. Coffee being produced from spent, exhausted grounds is extracted at high temperature and under high pressure.

The coffee extract to be concentrated by freeze concentration can have any coffee solids content from a few percent to as high as 40 to 50 percent. That is, there may be as much as 40 to 50 pounds of coffee solids in the extract for each 100 pounds of extract. However, the lower the solids content of the extract, the more the water which must be removed during the freeze concentration and drying steps. On the other hand, it has been found that carrying the extraction process to the point where high coffee solids content can be achieved often lowers the flavor quality of the extract. Thus, a preferred range of coffee solids content of the extract for the practice of this invention is from about 10 to 30 percent coffee solids.

In prior art processes, after leaving the extractor system, the coffee extract is clarified of sediment while still at an elevated temperature. One of the most common methods of clarification is by means of a centrifuge in which the coffee liquid is passed through a rapidly rotating cylinder and discharges the clear liquid. Another method is by means of a pressure pump forcing the concentrate through porous paper or cloth.

However, according to one embodiment of the process of this invention, the hot coffee extract is first chilled to near the freezing point so that waxes, tars and gums which are soluble in the hot extract are precipitated therefrom. The cold extract is then subjected to filtration or centrifugation to free it, not only of the precipitated gums, tars and waxes, but also from any sediment resulting from the extraction process.

Because the initial freezing point of the coffee extract is dependent on the total coffee solids content of the extract, the temperature to which the extract should be chilled to precipitate the gums, tars and waxes varies with the exact nature of the extract. Ordinarily, however, minimum temperatures of 40° F. and below may be employed in the process of this invention. If it is not desired to form ice in the extract during the precipitation process, the temperature to which the extract is chilled should not be below the initial freezing point.

For a coffee extract having 30 weight percent coffee solids, the temperature is about 27° F.

In practice, it has been found that the tars, waxes and gums will begin to precipitate from coffee at temperatures as high as about 80° F. and that the major portion of insolubles will precipitate at temperatures above 32° F. Thus, an embodiment of this invention comprises chilling the extract to between 80° and 32° F. prior to filtration and freeze concentration. Preferred temperatures for the chilling operation are between about 45° and 32° F. because this temperature range insures virtually complete removal of insolubles.

The coffee extract may be chilled by any convenient means. However, it is preferred to keep the extract under agitation so that the wax and gums formed during the precipitation step do not adhere to the heat transfer surface of the refrigeration means used to precipitate. If desired, the chilled extract may be held at the low temperature for from a few seconds to several or many hours before the waxes, tars and gums are removed, either by centrifugation or filtration. The formation and precipitation of tars, gums and waxes is often time-dependent and complete precipitation may require holding the material at the low temperature employed until the process is complete. Thus, when conducting the process of this invention in a continuous fashion, the time elapsed between the chilling to precipitate waxes and actual separation of the waxes, tars and gums from the chilled coffee extract will depend on the exact nature of the extract.

In some coffee extracts, continued exposure to low temperature will also cause the formation of a nonwaxey particulate precipitate. This particulate precipitate forms after the formation of insoluble tars, waxes and gums and does not interfere with the centrifugal separation of ice from concentrated coffee extract after the freeze concentration process. However, such exposure to low temperatures sufficient to cause this particulate precipitate should be avoided because it is tantamount to degradation of the coffee extract. The resulting concentrated product, after this degradation, is not as satisfactory to the consumer as coffee produced from extract which has been chilled only sufficiently to cause the precipitation of tars, gums and waxes.

Depending upon the exact nature of the coffee blend employed in preparing the extract and the extract itself, from less than 0.5 to about 5 percent by weight of tars, gums and waxes will form during the precipitation step. Although most of the gums, waxes and tars which will form from the coffee extract form at near the initial freezing point of the extract, more may form after the extract is subjected to freeze concentration. Thus, another embodiment of this invention comprises cooling the coffee extract to below the initial freezing temperature to precipitate the insoluble wax, tar or gum and forming a minor amount of ice in the extract. The extract can then be freed of the waxes and tars by filtration, decantation or centrifugation. In this embodiment of the invention, the minor portion of ice formed can be removed along with the waxes and tars, or the extract can be slightly warmed to allow the ice to melt prior to removal of the waxes and tars by filtration, decantation or centrifugation.

The tars, waxes or gums produced by the chilling of the coffee extract can be removed in any convenient fashion as pointed out above. The chilled extract may be held at the chilled temperature until such time as the precipitate settles to the bottom or the container and the precipitate-free portion of the solution can be decanted - - and then subjected to further processing. Alternatively, the chilled extract may be processed in the same manner as hot coffee extract which is to be freed from sediment. Thus, centrifugation, batch or continuous, or pressure filtration techniques; all well known to the art, may be employed to separate the extract from the precipitate.

After being freed from the precipitate, the resulting precipitate-free coffee extract is then subjected to concentration by partial freezing of the water therefrom. This freeze concentration process can be conducted in batch, semicontinuous or continuous apparatus according to methods known to the art and improvements of the methods. However, any method of removing the water from the coffee extract by crystallization as ice is applicable to the process of this invention. The resulting slurry of ice and concentrated coffee extract is then subjected to centrifugation to free the concentrated solution of the ice crystals. The resulting ice crystals are ordinarily washed with water or dilute coffee extract to free the ice crystals completely of residual mother liquor and the washings may be returned to the freeze concentration process. The practice of this invention has the advantage that the centrifuge basket does not become plugged with precipitated tars and waxes and the separation and washing processes are facilitated in their efficiency.

The freeze concentration of the wax, tar and gum free comestible liquid or extract can be accomplished in either a single stage or in a plurality of stages, each of which comprises a crystallizer in which heat is paddles. Alternatively, a conventional scraped surface tubular heat exchanger the coffee extract to form a slurry of ice crystals and concentrated mother liquor. After each crystallization stage, ice is removed from the slurry and the concentrated extract either goes to further processing in the preparation of soluble or powdered coffee or is further concentrated in a subsequent stage of the freeze concentration process. The crystallization of ice from the extract is preferably carried out in a tubular heat exchanger, the outside surfaces of which are cooled by a circulating refrigerant. The internal section of the tube is ordinarily fitted with a shaft on which is located agitator heat exchanger may be employed. Any acceptable separating device or centrifuge may be employed for separating the concentrated coffee extract from the resulting ice crystals. This centrifuge is the preferred method for separating ice from the mother liquor and ordinarily consists of a rotating basket which contains perforations for allowing passage of the mother liquor. The centrifuge may also be equipped with some means for washing residual mother liquor from the ice crystals.

Referring now to the drawing accompanying this application, an aqueous comestible extract enters a chilling or cooling apparatus 10 through feedline 11. The chiller may be a conventional refrigeration unit, a continuous tubular heat exchanger or the chilling operation may be conducted in a batch manner by placing containers of extract in a refrigerated room. The chilled extract is then fed to the filter 12 through line 13. The filter apparatus may be a conventional batch filtration unit or, where the precipitated wax or tar can be handled on a centrifuge basket, may comprise a rotating basket centrifuge or ordinary laboratory or batch-type centrifuge. The filtered extract; now free of tars, gums and waxes; is conveyed through line 14 so the tubular crystallizer 15 where the temperature is lowered sufficiently to cause ice to form in the extract. The exact degree of concentration depends upon the cooling medium and temperature on the outside of the crystallizer 12 and the residence time in the crystallizer. Concentrated slurry of ice and mother liquor is then conducted to a separating apparatus 16 through the line 17. The separating apparatus 16 is preferably a rotating basket centrifuge in which the basket is an open screen material which allows concentrated mother liquor to be removed from the outside periphery of the centrifuge through the line 18 while ice, preferably reslurried in either water or feed extract, is removed via line 19.

As pointed out above, the crystallizing concentration operation may be conducted in a plurality of stages.

The following examples are illustrative of the process of this invention.

EXAMPLE 1

A batch of coffee extract containing 24 percent coffee solids were precooled to below 40° F. and admitted to a tubular heat exchanger having an internal agitator. The coffee extract was fed to the heat exchanger at the rate of 3 gallons per minute and coffee extract was recirculated around the heat exchanger until ice crystals had formed due to the cooling internally. Recirculation of slurry and mother liquor was continued as coffee extract was fed to the crystallizer, the internals of which were maintained at a temperature of 27° F. A slurry of ice and coffee liquor containing about 30 percent coffee solids was then continuously removed from the crystallizer and fed to a continuous-type rotating basket centrifuge. The centrifuge basket was in the form of a perforated screen which allowed coffee liquor to pass through the ice cake, thus separating the ice from the coffee liquor. After 10 minutes of operation, the centrifuge screen plugged with tars and waxes which were precipitated from the coffee extract during the cooling and crystallization process. This caused the operation to stop, due to improper separation of ice and mother liquor.

This procedure is repeated except that the extract is fed to the crystallizer without first prechilling. Tars and gums form along with the ice and the centrifuge plugs in the same manner as if the extract had been prechilled.

EXAMPLE 2

The general procedure of example 1 was repeated except that the chilled coffee extract was filtered through fine cheesecloth prior to introduction into the crystallizer. In this filtration process, approximately 1.9 percent of the original extract was removed as tars, gums or waxes. The resulting precipitate-free coffee liquor was then admitted to the crystallizer vessel and the slurry produced in the crystallizer was centrifuged continuously. The ice mother liquor separation was not impeded by plugging of the centrifuge screen with precipitate.

Excellent results are also obtained when coffee liquor to be concentrated is precooled from 80° to 36° F., and when the extract has from 12 to 32 percent coffee solids.

EXAMPLE 3

A tea extract containing 6.8 percent tea solids, at above 80° F. after extraction, is cooled in a heat exchanger to 36° F. The cooled material is then filtered through a filter press and the resulting tar-free extract is freeze concentrated in a tubular crystallizer. The resulting ice-concentrated tea slurry is easily separated on a rotating basket screen-type centrifuge as described above.

The process of this invention is applicable to any aqueous comestible liquid material or liquid extract which is to be concentrated by formation of ice and subsequent removal of ice. Thus, the process of this invention may be used in connection with the freeze concentration of coffee, tea, grape juice, orange juice, beer, vinegar and the like.

Although the invention has been described with reference to particular embodiments thereof, it is to be understood that various changes may be made without departing from the spirit of the invention as defined by the scope of the appended claims.

We claim:

1. A process of the concentration of a liquid aqueous coffee extract which when chilled produces a precipitate which is insoluble in said extract above the temperature at which ice forms therein, comprising: chilling a feed liquid extract containing 24 percent by weight dissolved solids to a temperature between 80° and 36° F. to form a precipitate therein; holding said liquid extract at a chilled temperature below 80° F. until precipitate forms; separating said precipitate and said extract; subsequently concentrating said extract by subjecting said liquid extract to reduced temperature to form a mixture of ice and concentrated liquid extract; separating ice from said concentrated extract; and treating the ice to recover residual coffee solids therefrom.

2. The process according to claim 1 in which the chilled extract is agitated at temperatures between 80° F. and 36° F.

3. A process according to claim 1 wherein the chilled extract is held at a temperature between 36° F. and 45° F.

4. A process according to claim 1 wherein the chilled extract after removal of precipitate is freeze concentrated to remove part of the water present in the extract, as ice, the ice is washed and coffee solids are recovered from the washings.

5. A process as claimed in claim 1 wherein separation of precipitate is effected by filtration above 36° F.

6. A process as claimed in claim 1 wherein separation of precipitate is effected by centrifugation above 36° F.

7. A process as claimed in claim 1 wherein the precipitate free liquid extract is concentrated in a single-stage crystallizing process.

8. A process as claimed in claim 1 wherein the precipitate free liquid extract is concentrated in a multistage crystallizing process.

9. A process as claimed in claim 1 wherein the precipitate free liquid extract is concentrated in a tubular scraped surface heat exchanger.

10. A process as claimed in claim 1 wherein ice is separated from the liquid in a centrifuge and the ice is washed while in the centrifuge.

11. A process as claimed in claim 10 wherein washing liquid is treated to recover coffee content therefrom after washing the ice.

12. A process as claimed in claim 1 in which the extract is agitated while forming a mixture of ice and concentrated extract.

* * * * *